(12) United States Patent
Atkinson

(10) Patent No.: US 7,117,739 B2
(45) Date of Patent: Oct. 10, 2006

(54) FLUID-GAUGING PROBES

(75) Inventor: Harry Atkinson, Wokingham (GB)

(73) Assignee: Smiths Group PLC, (GB)

( * ) Notice: Subject to any disclaimer, the term of this patent is extended or adjusted under 35 U.S.C. 154(b) by 135 days.

(21) Appl. No.: 11/044,684

(22) Filed: Jan. 28, 2005

(65) Prior Publication Data

US 2005/0203411 A1    Sep. 15, 2005

(30) Foreign Application Priority Data

Feb. 7, 2004  (GB) ................................ 0402744.7

(51) Int. Cl.
*G01F 23/00*    (2006.01)
(52) U.S. Cl. .................. 73/290 V; 73/290 R
(58) Field of Classification Search ............. 73/290 V, 73/290 R
See application file for complete search history.

(56) References Cited

U.S. PATENT DOCUMENTS

| | | | | |
|---|---|---|---|---|
| 2,753,542 A | * | 7/1956 | Rod et al. ................... | 367/97 |
| 4,427,132 A | * | 1/1984 | Thomson .................... | 222/23 |
| 4,572,981 A | * | 2/1986 | Zola ........................... | 310/357 |
| 4,815,323 A | * | 3/1989 | Ellinger et al. ............. | 73/290 V |
| 5,095,748 A | * | 3/1992 | Gregory et al. ............ | 73/290 V |
| 5,264,831 A | * | 11/1993 | Pfeiffer ....................... | 340/621 |
| 5,586,085 A | * | 12/1996 | Lichte ........................ | 367/99 |
| 5,793,705 A | * | 8/1998 | Gazis et al. ................. | 367/98 |
| 5,856,953 A | * | 1/1999 | Durkee ....................... | 367/99 |
| 5,877,997 A | * | 3/1999 | Fell ............................ | 367/99 |
| 5,996,407 A | * | 12/1999 | Hewitt ........................ | 73/290 V |
| 6,598,473 B1 | * | 7/2003 | Atkinson .................... | 73/290 V |
| 6,786,090 B1 | * | 9/2004 | Benghezal et al. ......... | 73/290 V |
| 6,968,738 B1 | * | 11/2005 | Atkinson .................... | 73/290 V |
| 6,993,967 B1 | * | 2/2006 | Forgue ....................... | 73/290 V |

FOREIGN PATENT DOCUMENTS

| | | |
|---|---|---|
| GB | 2 084 322 | 4/1982 |
| GB | 2 362 468 | 11/2001 |
| WO | WO 98/04889 | 2/1998 |

OTHER PUBLICATIONS

International Search Report No. GB0500962.6, dated Apr. 28, 2005, 1 page.

* cited by examiner

*Primary Examiner*—Daniel S. Larkin
*Assistant Examiner*—Rodney Frank
(74) *Attorney, Agent, or Firm*—Connolly Bove Lodge & Hutz LLP

(57) ABSTRACT

An ultrasonic fluid-gauging probe has a still well and two or more piezoelectric transducer elements mounted at its lower end. A drive and processor unit may separately energize each element and provide a separate output indicative of fluid height so as to provide redundancy. Alternatively, one element may be energized and the other used to receive the reflected signal in normal use but, when a fault is detected, one element may be used to both transmit and receive. The elements may be mounted side-by-side, such as on a common substrate, or one above the other in a stack.

14 Claims, 4 Drawing Sheets

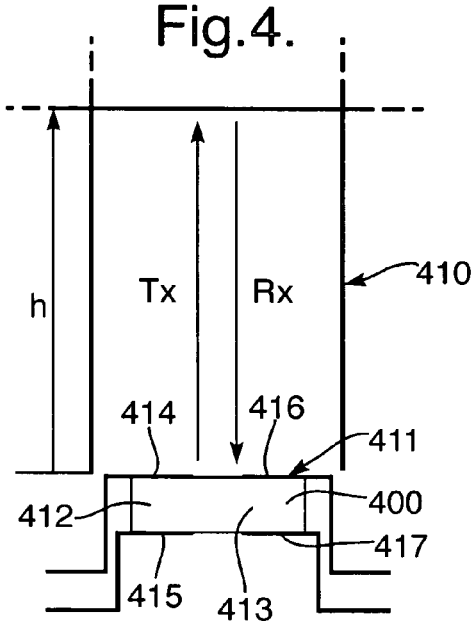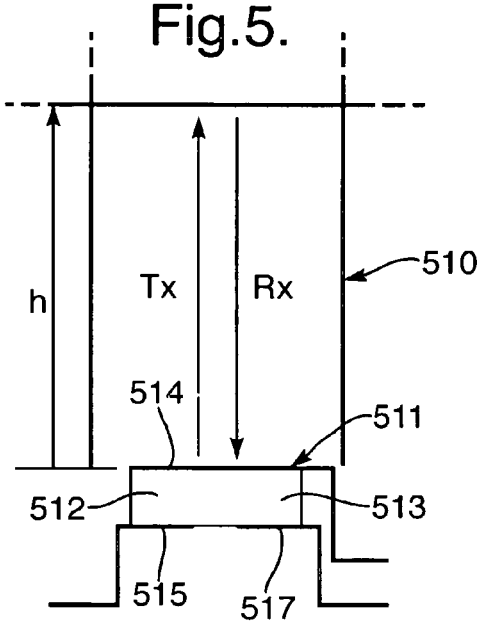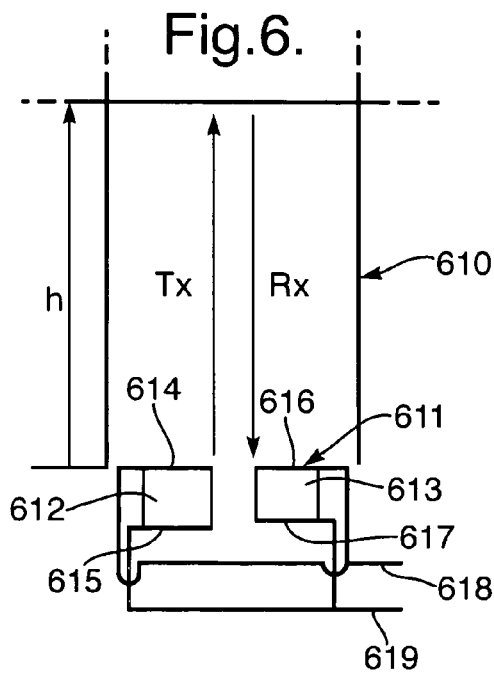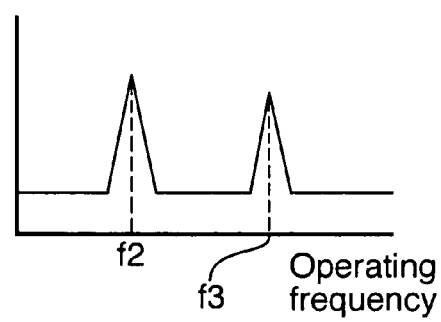

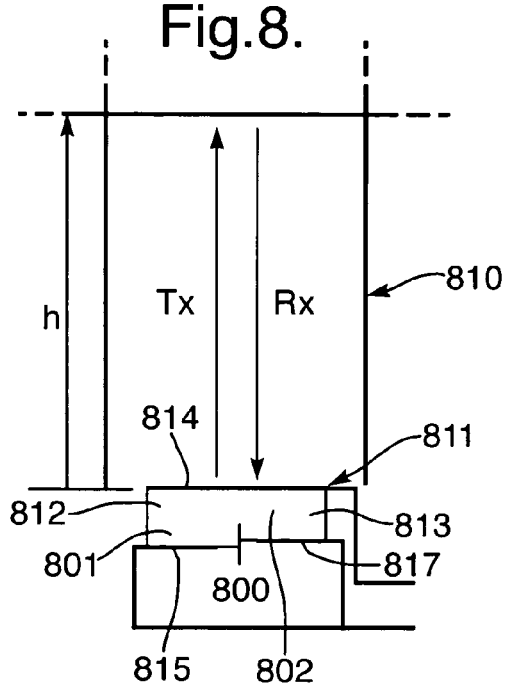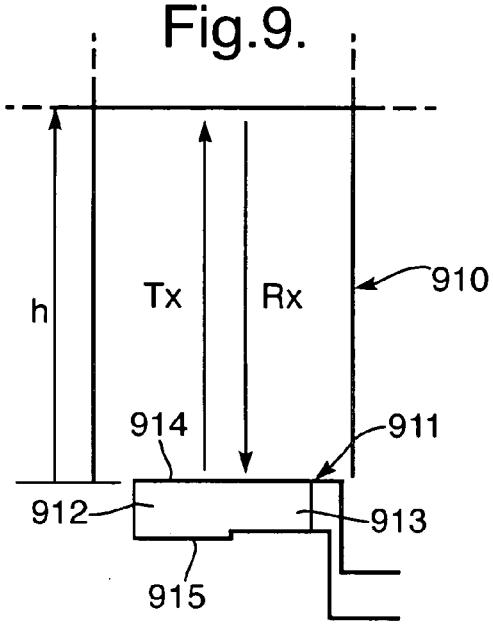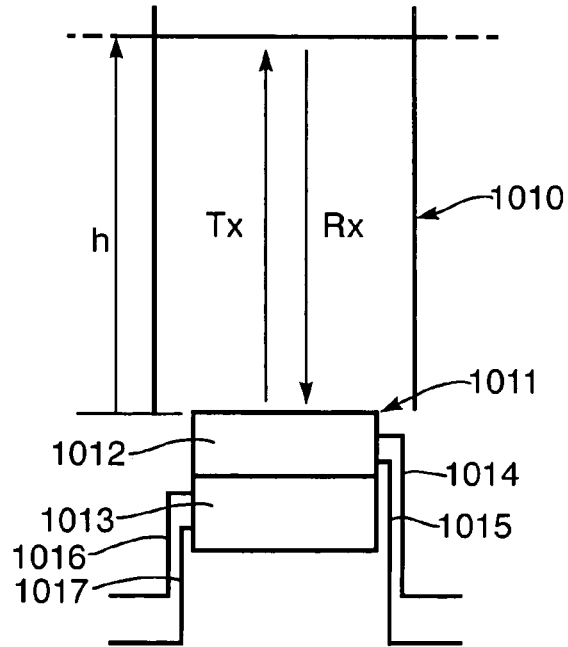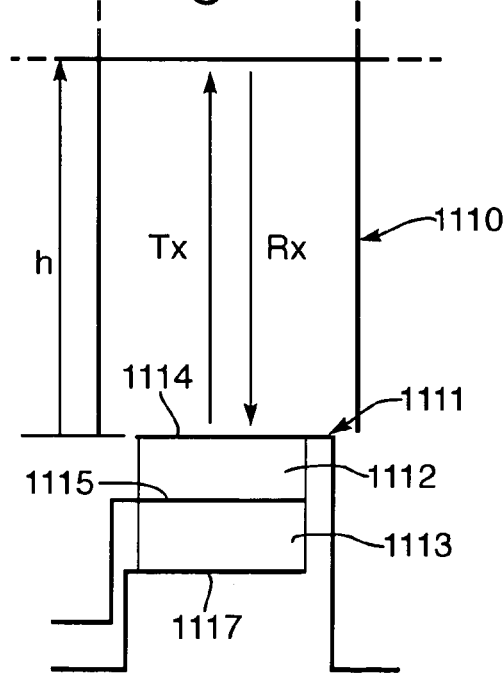

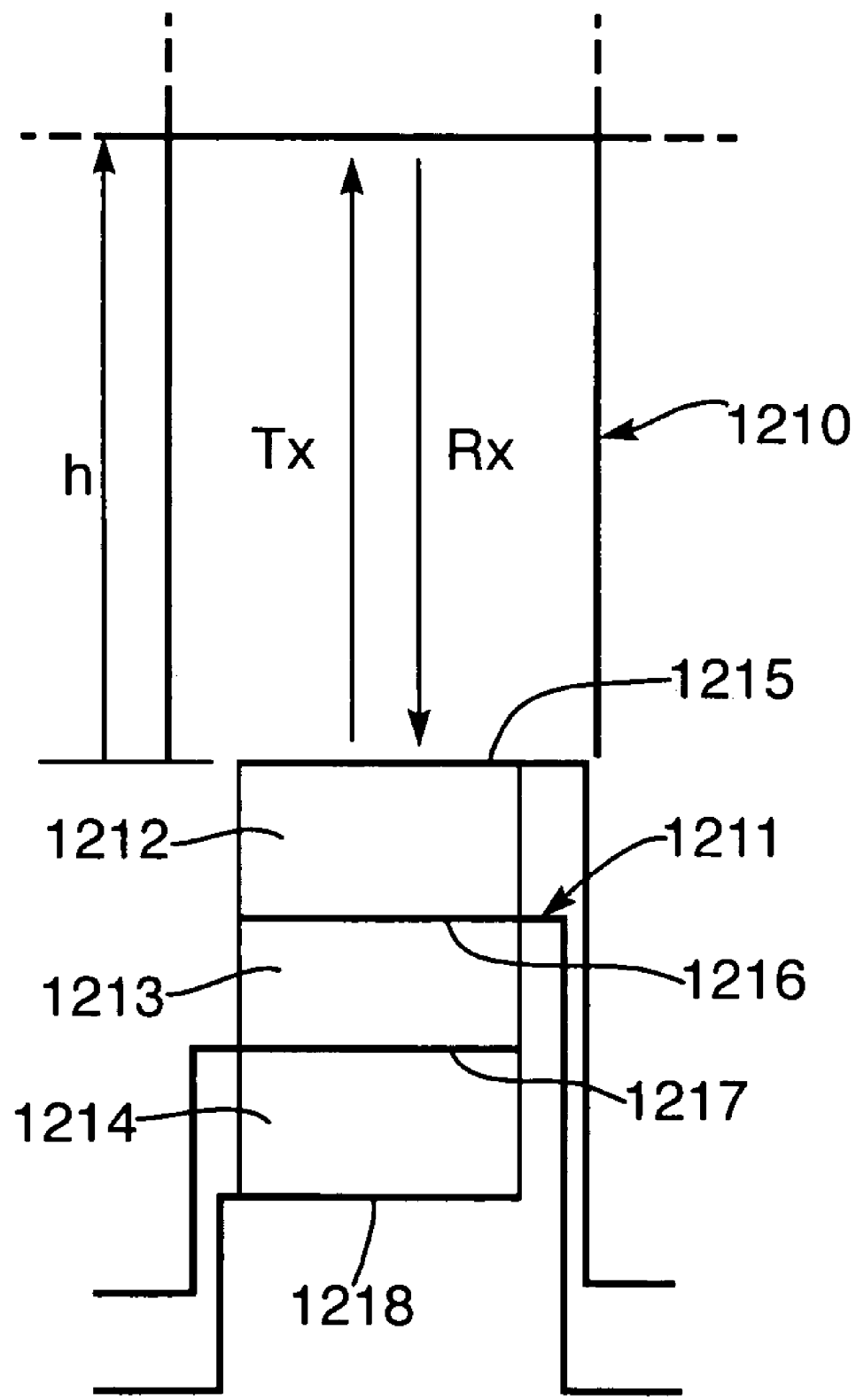

FLUID-GAUGING PROBES

BACKGROUND OF THE INVENTION

This invention relates to fluid-gauging probes.

Ultrasonic fluid-gauging probes, such as for measuring the height of fuel in an aircraft fuel tank, are now well established and examples of systems employing such probes can be seen in U.S. Pat. No. 5,670,710, GB2380795, GB2379744, GB2376073, U.S. Pat. No. 6,598,473 and U.S. Pat. No. 6,332,358. The probe usually has a tube or still well extending vertically in the fuel tank and a piezoelectric ultrasonic transducer mounted at its lower end. When the transducer is electrically energized it generates a burst of ultrasonic energy and transmits this up the still well, through the fuel, until it meets the fuel surface. A part of the burst of energy is then reflected down back to the same transducer. By measuring the time between transmission of the burst of energy and reception of its reflection, the height of fuel in the still well can be calculated.

Because the probe only has one transducer, failure or partial failure of the transducer or its associated electrodes or electrical circuit results in a complete loss of information from the probe. In order to provide sufficient reliability and redundancy in, for example, aircraft applications, it is usual to provide additional probes so that sufficient information can be provided in the event of probe failure. This leads to extra cost and weight.

BRIEF SUMMARY OF THE INVENTION

It is an object of the present invention to provide alternative fluid-gauging probes.

According to one aspect of the present invention there is provided a fluid-gauging probe including a still well and at least two acoustic transducer elements mounted towards one end of the still well, the transducer elements being energizable to propagate acoustic energy into fluid within the still well and to receive acoustic energy reflected by a fluid interface within the still well.

Each of the transducer elements may be arranged to propagate energy and each of the transducer elements may be arranged to receive energy. Alternatively, the probe may be operable in a first mode where one element propagates energy into the fluid and another element receives the reflected energy, the probe being capable of being changed to operate in a second mode where one element both propagates and receives energy. The probe may be arranged to be switched from the first to the second mode when a fault is detected. The transducer elements may be provided on a common substrate. The transducer elements may have an electrode common to two elements. The transducer elements may be each operable at the same frequency or they may be operable at different frequencies. The transducer elements may be mounted side-by-side. Alternatively, they may be mounted one above the other and the elements may be selectively operable at different frequencies by using different combinations of pairs of electrodes. The transducer elements are preferably of a piezoelectric ceramic.

According to another aspect of the present invention there is provided a fluid-gauging system including a probe according to the above one aspect of the present invention.

Various different configurations of probe according to the present invention will now be described, by way of example, with reference to the accompanying drawings.

BRIEF DESCRIPTION OF THE DRAWINGS

FIG. 4 is a simplified cross-sectional side elevation view of a fourth form of probe;

FIG. 5 is a simplified cross-sectional side elevation view of a fifth form of probe;

FIG. 6 is a simplified cross-sectional side elevation view of a sixth form of probe;

FIG. 7 is a graph illustrating the system transfer function of the probe shown in FIG. 6;

FIG. 8 is a simplified cross-sectional side elevation view of a seventh form of probe;

FIG. 9 is a simplified cross-sectional side elevation view of an eighth form of probe;

FIG. 10 is a simplified cross-sectional side elevation view of a ninth form of probe;

FIG. 11 is a simplified cross-sectional side elevation view of a tenth form of probe; and FIG. 12 is a simplified cross-sectional side elevation view of an eleventh form of probe.

DETAILED DESCRIPTION OF THE PREFERRED EMBODIMENTS

Figure 1:
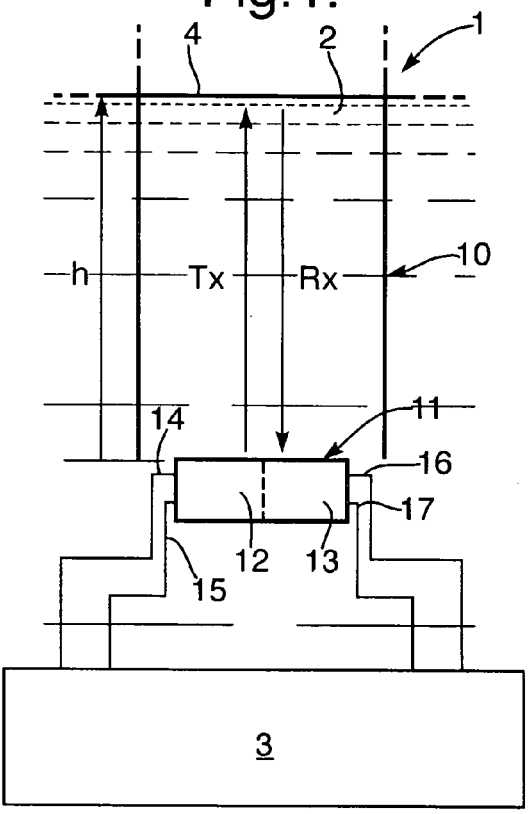
FIG. 1 is a simplified cross-sectional side elevation view of a first form of probe.

With reference first to FIG. 1 the fuel-gauging system comprises a probe 1 mounted projecting vertically, or substantially vertically, upwardly from the floor of a fuel tank (not shown). The probe 1 has a tubular still well 10 and an acoustic device in the form of a piezoelectric transducer assembly 11 mounted at the lower end of the still well so that it is immersed in any fuel 2 that is present. The transducer assembly is usually mounted in a housing that is acoustically-transparent at the frequency of operation so as to protect the piezoelectric ceramic from direct contact with fuel. A foam pad (not shown) or the like on the lower surface of the transducer provides damping. The transducer assembly 11 has two piezoelectric elements 12 and 13, which may be two halves of a circular disc shape cut across its diameter. Electrodes 14, 15 and 16, 17 connected to the two elements 12 and 13 are connected to a drive and processing unit 3. The unit 3 is arranged to apply bursts of alternating voltage to the electrodes 14 to 17 so as to energize both elements to resonate and produce bursts of ultrasonic energy that are propagated upwardly along the still well 10. The processing unit 3 also receives electrical signals produced in the two elements 12 and 13 by the bursts of energy reflected from the fuel surface 4 and incident on the elements. The processing unit 3, measures the time between transmission of the ultrasonic energy and reception of the reflection and calculates the height h of fuel within the still well 10 in the usual way from knowledge of the speed of transmission of the acoustic energy. It will be appreciated that in most systems there will be several probes distributed about the tank in order to measure the height at different locations. If either one of the elements 12 or 13 or their associated electrodes or circuits should fail or partially fail, the processor 3 simply uses the signal from the remaining element, thereby providing a degree of redundancy against failure.

Instead of operating the transducer elements 12 and 13 collectively in the manner described above, one element could be used in a first mode to produce the transmitted signal and the other element used to derive the reflected signal. In such an arrangement, if there was a failure, the processing unit 3 would revert to a second mode where it attempts to use one element both to propagate and receive the ultrasonic energy. If this failed, it would attempt to use the other element.

It will be appreciated that the probe could have different numbers of transducer elements, such as three, four or more and that they could be of various different shapes.

Figure 2:
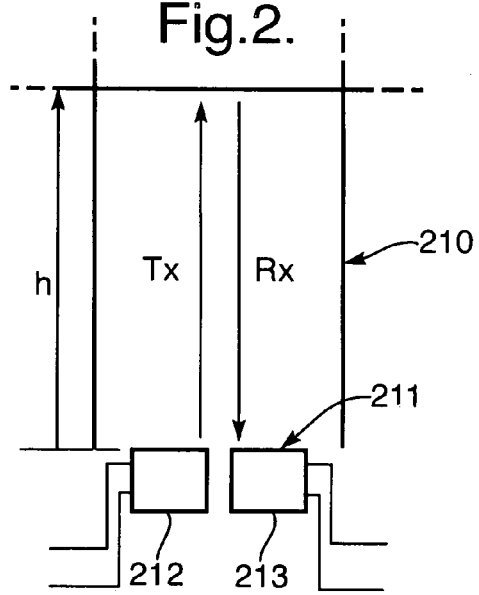
FIG. 2 is a simplified cross-sectional side elevation view of a second form of probe.

FIG. 2 shows an arrangement where the transducer elements 212 and 213 are physically spaced laterally and completely separate from one another. These elements 212 and 213 can be operated completely separately of one another and may have different frequencies. Where the transducer elements have matched characteristics, such as optimum frequency, they can be operated together, with one element receiving reflected signals produced by the other element. Again, a probe could have a cluster of any number of such transducer elements.

Figure 3:
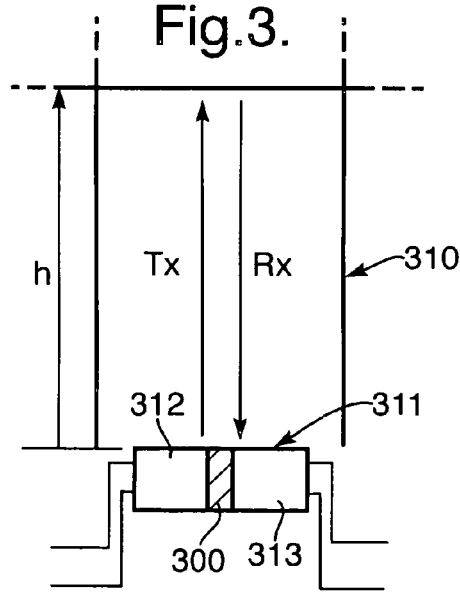
FIG. 3 is a simplified cross-sectional side elevation view of a third form of probe.

As shown in FIG. 3, the gap between separated transducer elements 312 and 313 could be filled by a filler material 300 that is electrically non-conductive and acoustically transparent so that energization of one element can energize the other or others of the elements.

The arrangement in FIG. 4 shows how multiple transducer elements 412 and 413 can be provided on a common piezoelectric ceramic substrate 400 by physically separating the electrodes 414 to 417.

The number of electrodes can be reduced in a probe 510 of the kind shown in FIG. 5 where a transducer 511 with two elements 512 and 513 has three electrodes namely a single, common electrode 514 extending across the entire upper surface of both elements and two separate electrodes 515 and 517 on the lower surface disposed in the regions of the two elements. In general, for a probe having n transducer elements, this arrangement enables the number of electrodes to be reduced from 2n to n+1.

The different transducer elements need not be matched and operate at the same frequency. FIG. 6 shows a probe 610 with two elements 612 and 613 having different thicknesses and hence different thickness mode resonant frequencies. The upper electrodes 614 and 616 and the lower electrodes 615 and 617 of these two elements are connected with one another as two output lines 618 and 619. FIG. 7 illustrates the different optimum operating frequencies $f_2$ and $f_3$ of the two elements 612 and 613 respectively. It will be appreciated that the different operating frequencies of the elements enables the processor to discriminate between the different elements so that individual ones of the elements can be selected by appropriate choice of frequency.

FIG. 8 shows a probe 810 having two transducer elements 812 and 813 of different thicknesses and operating frequencies formed on a common blank 800 of piezoelectric material by appropriately machining the blank with two regions 801 and 802 of different thickness. It will be seen that this arrangement has a common electrode 814 on the upper surface and two interconnected electrodes 815 and 817 on the lower surface. Instead of having two separate electrodes on the lower surface, there could be a single common electrode 915 as shown in FIG. 9.

The arrangements described above have the transducer elements disposed laterally of one another, they could, however, be stacked one above the other as shown in FIG. 10. In this configuration there are two elements 1012 and 1013 mounted one on the other and each having two separate electrodes 1014 and 1015, and 1016 and 1017. In such an arrangement, the upper element 1012 or elements are selected to be acoustically transparent to the frequencies of operation of the element 1013 or elements below.

The number of electrodes in a stack arrangement can be reduced in the manner shown in FIG. 11 where a common electrode 1115 is used both for the lower surface of the upper piezoelectric element 1112 and the upper surface of the lower piezoelectric element 1113. For a stack of n elements this enables the number of electrodes to be reduced from 2n to n+1.

Instead of operating the elements individually, they could be operated together by energizing non-adjacent electrodes. In the arrangement of FIG. 11, for example, the middle electrode 1115 would be held at a high impedance and the two elements 1112 and 1113 would be driven together by energizing the top and bottom electrodes 1114 and 1117. The optimum frequency of operation is dependent on the combined thickness of the two elements 1112 and 1113. Thus, with a stack of two elements the individual elements can each be operated separately at one frequency and the combined elements can be operated together at a different, lower frequency.

As the number of elements in the stack increases, so does the number of different operating modes. FIG. 12 shows a stack of three transducer elements 1212, 1213 and 1214 with four electrodes 1215 to 1218. This enables each of the elements 1212 to 1214 to be used individually, or the two different pairs of adjacent elements 1212 and 1213, and 1213 and 1214 to be operated together, or all three elements 1212, 1213 and 1214 to be operated together. The unused electrodes would be set to a high impedance condition It will be appreciated that there are various different arrangements in which a probe could be provided with more than one transducer element. Instead of using piezoelectric ceramics, it may be possible to use alternative acoustic generating materials.

What I claim is:

1. A fluid-gauging probe comprising: a still well arranged to be mounted within a fluid, and at least two acoustic transducer elements mounted towards one end of said still well, wherein said transducer elements are energizable to propagate acoustic energy into fluid within said still well and to receive acoustic energy reflected by a fluid interface within the still well.

2. A fluid-gauging probe according to claim 1, wherein each of said transducer elements is arranged to be energized to propagate energy and each of said transducer elements is arranged to receive energy.

3. A fluid-gauging probe according to claim 1, wherein said probe is operable in a first mode where one said element propagates energy into said fluid and another said element receives the reflected energy, and wherein said probe can be changed to operate in a second mode where one element both propagates and receives energy.

4. A fluid-gauging probe according to claim 3, wherein said probe is arranged to be switched from the first to the second mode when a fault is detected.

5. A fluid-gauging probe according to claim 1, wherein said transducer elements are provided on a common substrate.

6. A fluid-gauging probe according to claim 1, wherein said transducer elements have an electrode common to two said elements.

7. A fluid-gauging probe according to claim 1, wherein said transducer elements are each operable at the same frequency.

8. A fluid-gauging probe according to claim 1, wherein at least two said transducer elements are operable at different frequencies.

9. A fluid-gauging probe according to claim 1, wherein said transducer elements are mounted side-by-side.

10. A fluid-gauging probe according to claim 1, wherein said transducer elements are mounted one above the other.

11. A fluid-gauging probe according to claim 1, wherein said transducer elements are of a piezoelectric ceramic.

12. A fluid-gauging probe comprising: a still well arranged to be mounted within a fluid, and a stack of at least two acoustic transducer elements mounted towards one end of said still well, wherein an electrode is disposed on the upper element in the stack and on the lower surface of the lowest element in the stack, wherein an electrode is disposed between adjacent elements in the stack to provide a lower electrode of an upper element and an upper electrode of a lower element, and wherein said transducer elements are energizable via said electrodes to propagate acoustic energy into fluid within said still well and to receive acoustic energy reflected by a fluid interface within the still well.

13. A fluid-gauging probe according to claim 12, wherein said transducer elements are selectively operable at different frequencies by using different combinations of pairs of electrodes on said elements.

14. A fluid-gauging system comprising: at least one fluid-gauging probe and a unit for driving said probe and receiving signals from said probe, wherein said probe includes a still well arranged to be mounted within a fluid, and at least two acoustic transducer elements mounted towards one end of said still well, wherein said transducer elements are energizable by said unit to propagate acoustic energy into fluid within said still well and to receive acoustic energy reflected by a fluid interface within said still well, and wherein signals produced by said transducer elements are supplied to said unit to derive an indication of fluid quantity.

* * * * *